United States Patent
Han et al.

(10) Patent No.: US 8,148,027 B2
(45) Date of Patent: Apr. 3, 2012

(54) ELECTRODE COMPOSITE MATERIAL

(75) Inventors: Ming Han, Singapore (SG); Siew Hwa Chan, Singapore (SG)

(73) Assignees: Nanyang Technological University, Singapore (SG); Gashub Technology Pte Ltd, Singapore (SG)

(*) Notice: Subject to any disclaimer, the term of this patent is extended or adjusted under 35 U.S.C. 154(b) by 345 days.

(21) Appl. No.: 12/440,203

(22) PCT Filed: Sep. 7, 2007

(86) PCT No.: PCT/SG2007/000300
§ 371 (c)(1),
(2), (4) Date: May 8, 2009

(87) PCT Pub. No.: WO2008/030198
PCT Pub. Date: Mar. 13, 2008

(65) Prior Publication Data
US 2010/0178583 A1    Jul. 15, 2010

Related U.S. Application Data

(60) Provisional application No. 60/824,874, filed on Sep. 7, 2006.

(51) Int. Cl.
*H01M 8/10* (2006.01)
*H01M 8/04* (2006.01)

(52) U.S. Cl. ........ 429/483; 429/413; 429/450; 429/492; 429/512

(58) Field of Classification Search ............... 429/483, 429/512, 413, 492, 450
See application file for complete search history.

(56) References Cited

U.S. PATENT DOCUMENTS

| | | | |
|---|---|---|---|
| 5,766,787 A * | 6/1998 | Watanabe et al. | 429/494 |
| 5,891,511 A * | 4/1999 | Coleman et al. | 427/64 |
| 6,165,388 A * | 12/2000 | Coleman | 252/520.1 |
| 6,355,149 B1 * | 3/2002 | Soczka-Guth et al. | 429/413 |
| 7,803,495 B2 * | 9/2010 | Min et al. | 429/492 |
| 2005/0053821 A1 | 3/2005 | Jang | |
| 2006/0166069 A1 | 7/2006 | Min et al. | |

FOREIGN PATENT DOCUMENTS

| | | |
|---|---|---|
| JP | 200585496 A | 10/2005 |
| KR | 2005121911 A | 12/2005 |

OTHER PUBLICATIONS

Büchi et al., Operating Proton Exchange membrane Fuel Cells Without External Humidification of the Reactant Gases, J. Electrochem. Soc., Aug. 1997, pp. 2767-2772, vol. 144, No. 8, The Electrochemical Society, Inc.
Chan et al., Matching of critical parameters in a small non-pressurized non-humidified PEMFC stack, Jorunal of Power Sources, 2006, pp. 385-391, vol. 158, Science Direct.
Chan et al., Guidelines for Stable Operation of a Polymer Electrolyte Fuel Cell with Self-Humidifying Membrane Electrolyte Assembly, Journal of The Elecetrochemical Society, pp. B486-B493, vol. 154(5), The Electrochemical Society, Inc, Mar. 2007.
Du et al., Performances of proton exchange membrane fuel cells with alternate membranes, Phys. Chem. Chem. Phys., pp. 3175-3179, vol. 3, The Owner Societies 2001, Jun. 2001.
Miyake et al., Evaluation of a Sol-Gel Derived Nafion/Silica Hybrid Membrane for Proton Electrolyte Membrane Fuel Cell Applications, Journal of the Electrochemical Society, pp. A898-A904, vol. 148(8), The Electrochemical Society, Inc, Jul. 2001.
Viswanathan et al, Is Nafion, the only Choice?, Bulletin of the Catalysis Society of India, 2007, pp. 50-66, vol. 6.
Watanabe et al., Self-Humidifying Polymer Electrolyte Membranes for Fuel Cells, J. Electrochem. Soc., Dec. 1996, pp. 3847-3852, vol. 143, No. 12, The Electrochemical Society, Inc.

\* cited by examiner

*Primary Examiner* — Helene Klemanski
(74) *Attorney, Agent, or Firm* — Seed IP Law Group PLLC

(57) ABSTRACT

The present invention refers to a self-humidifying electrically conducting composite material for the manufacture of a fuel cell.

30 Claims, 7 Drawing Sheets

Fig. 1
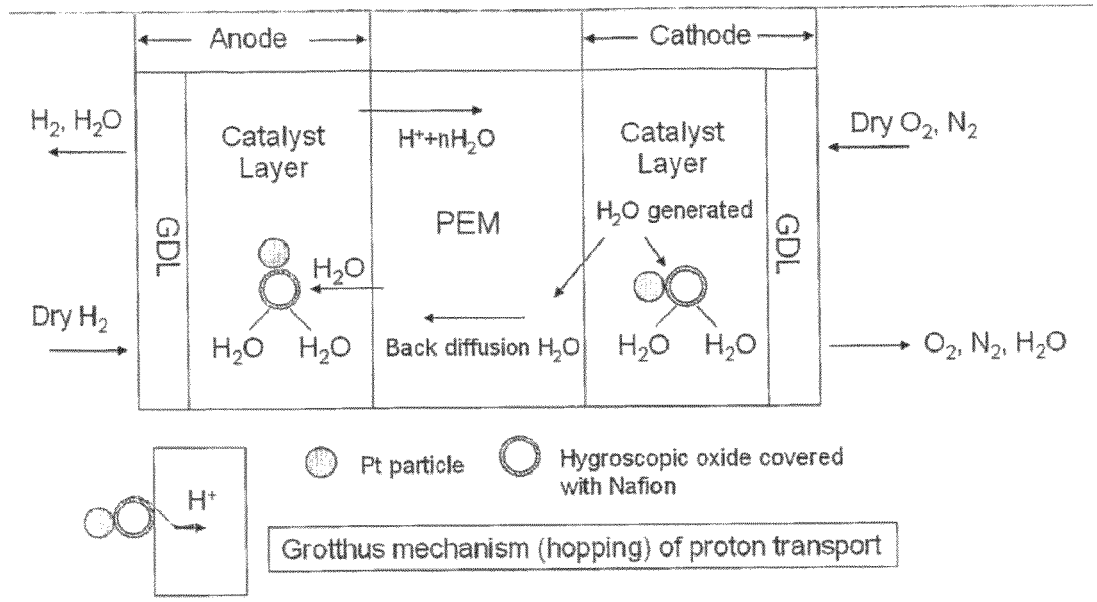
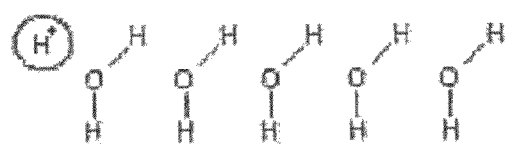
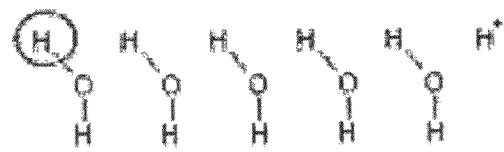
Fig. 1a

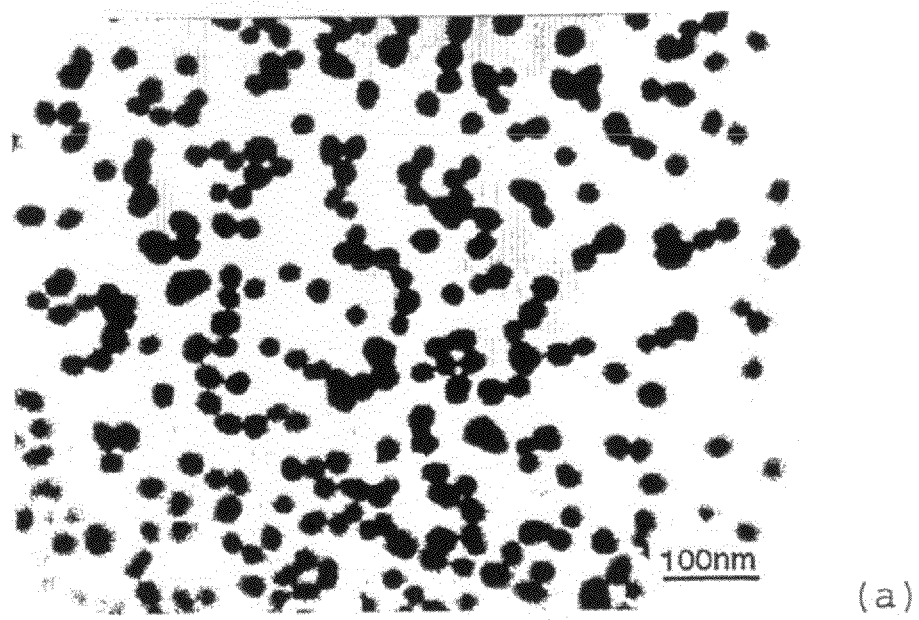
(a)
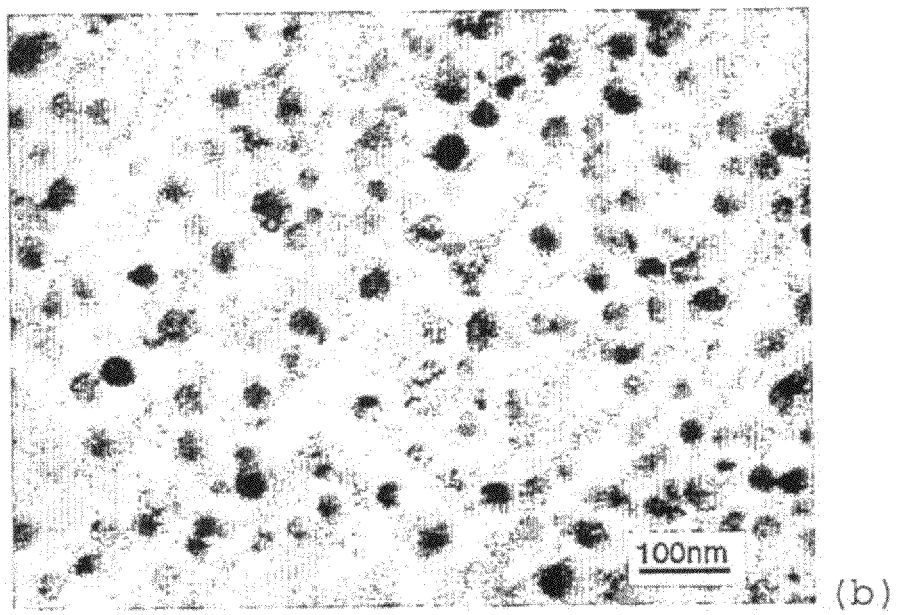
(b)
Fig. 2 a-b

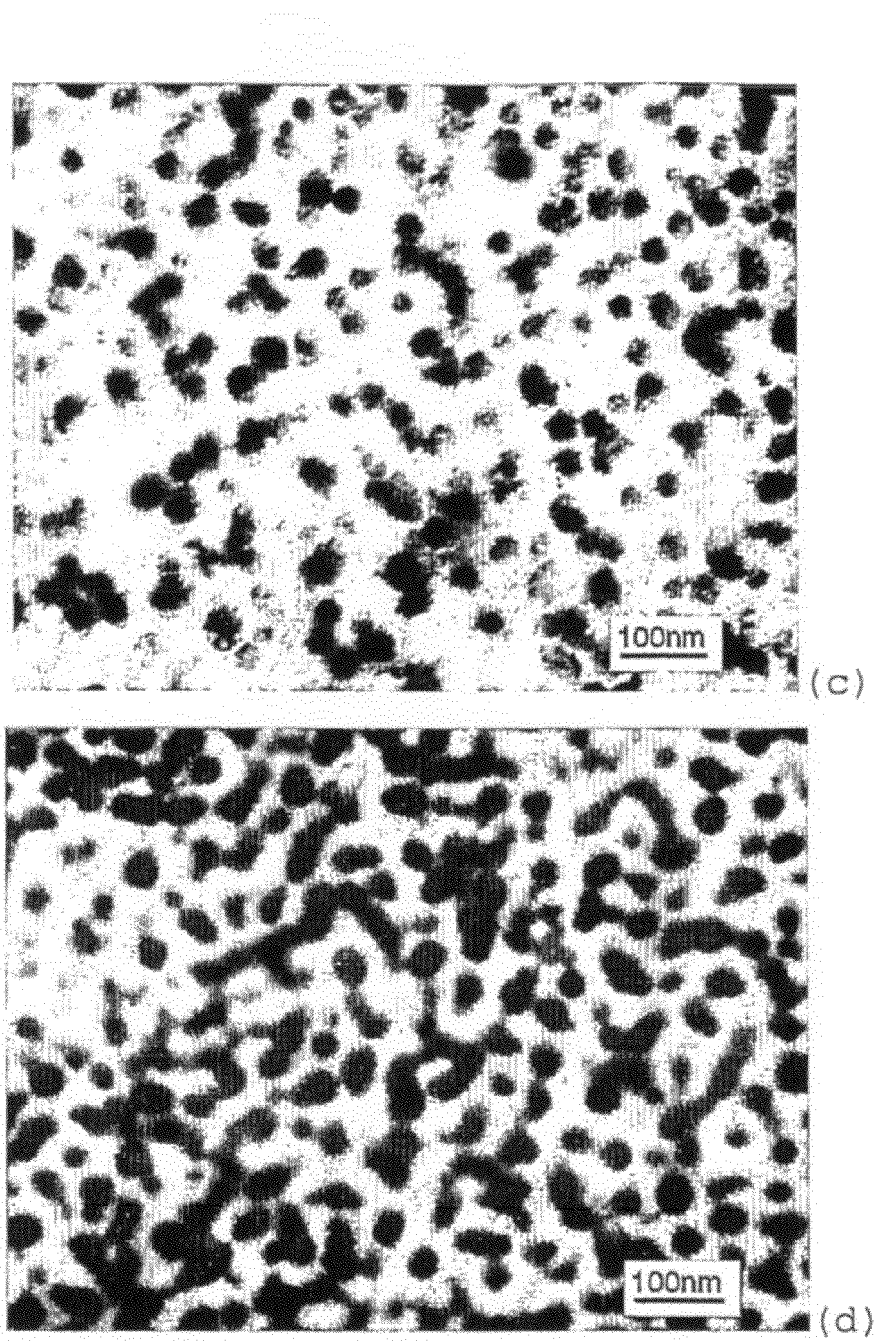
Fig. 2 c-d

Fig. 3
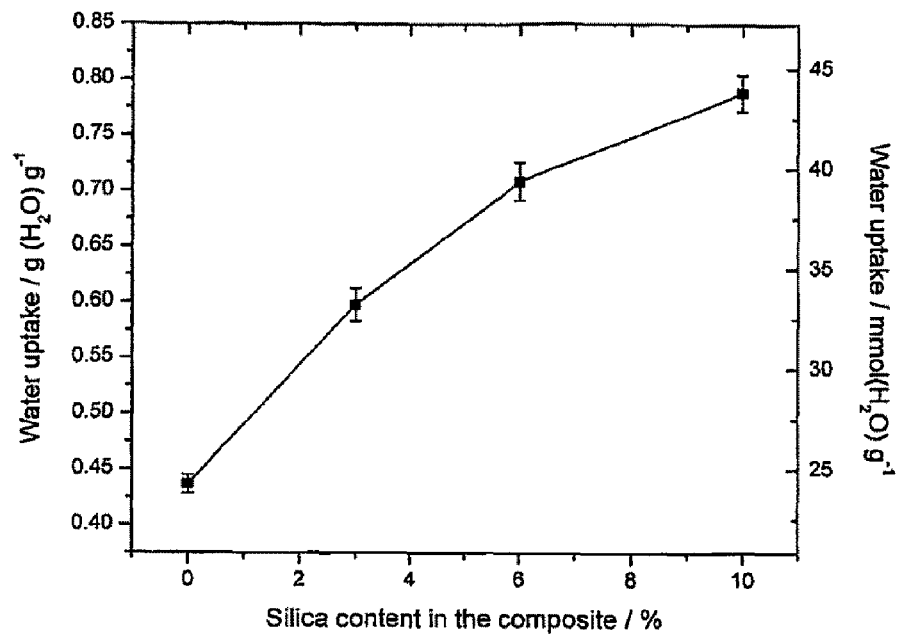
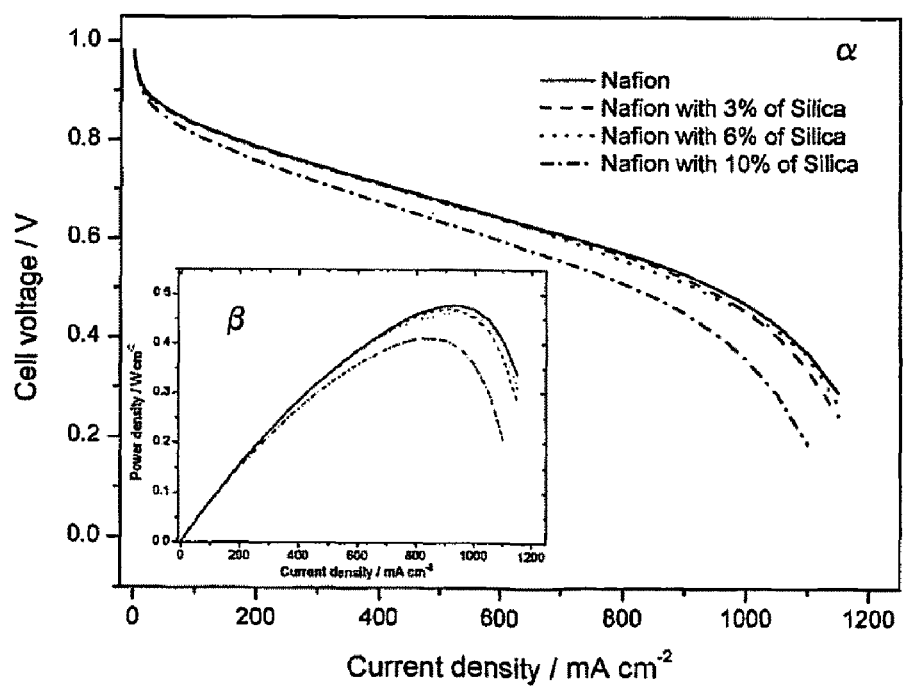
Fig. 4a

Fig. 8
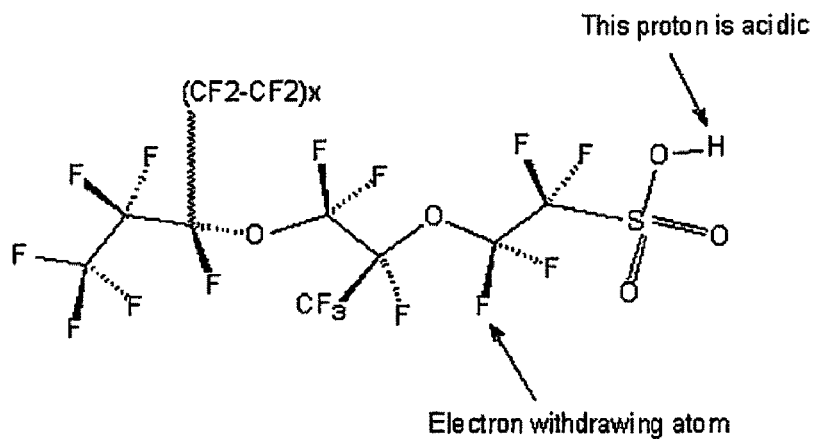
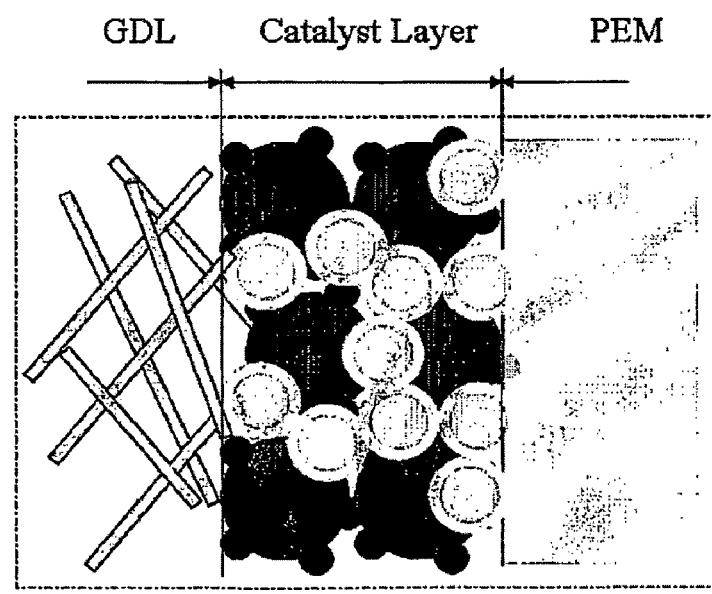
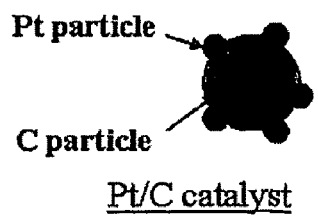
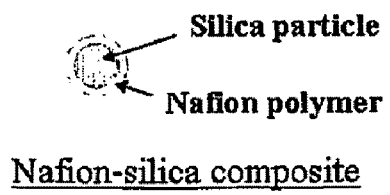
Fig. 9

ELECTRODE COMPOSITE MATERIAL

CROSS-REFERENCE TO RELATED APPLICATION

The present application is a U.S. national stage application filed under 35 U.S.C. §371 of International Patent Application PCT/SG2007/000300, accorded an international filing date of Sep. 7, 2007, which claims the benefit under 35 U.S.C. 119(e) of U.S. Provisional Patent Application No. 60/824,874 filed Sep. 7, 2006. The entire content of this application is incorporated herein by reference for all purposes.

FIELD OF THE INVENTION

The present invention relates to a self-humidifying electrically conducting composite material for the manufacture of a fuel cell.

BACKGROUND

A fuel cell is an electrical cell that converts the intrinsic chemical energy of the chemical reaction between a hydrogen-containing fuel and oxygen directly into direct-current electrical energy in a continuous catalytic process. As in the classical definition of catalysis, the fuel cell should not itself undergo change; that is, unlike the electrodes of a battery, its electrodes ideally remain invariant. As compared to other energy sources, fuel cells provide advantages that include low pollution, high efficiency, high energy density and simple fuel recharge.

Proton Exchange Membrane Fuel Cells (PEMFC; also referred to as Polymer Electrolyte Membrane Fuel Cell) are a type of fuel cell, which are believed to be the best type of fuel cell as the vehicular power source to eventually replace the gasoline and diesel internal combustion engines. First used in the 1960s for the NASA Gemini program, PEMFC's are currently being developed and demonstrated for systems ranging from 1 W to 2 kW.

PEM fuel cells use a solid polymer membrane as the electrolyte. This polymer is permeable to protons when it is saturated with water, but it does not conduct electrons or gases, such as oxygen and hydrogen. The fuel for the PEMFC is hydrogen and the charge carrier is the hydrogen ion (proton). At the anode, the hydrogen molecule is split into hydrogen ions (protons) and electrons. The hydrogen ions permeate across the electrolyte to the cathode while the electrons flow through an external circuit and produce electric power. Oxygen is supplied to the cathode and combines with the electrons and the hydrogen ions to produce water. The reactions at the electrodes are as follows:

Anode Reactions: 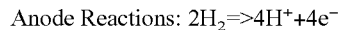 $2H_2 \Rightarrow 4H^+ + 4e^-$
Cathode Reactions: 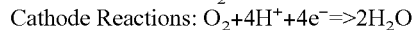 $O_2 + 4H^+ + 4e^- \Rightarrow 2H_2O$
Overall Cell Reactions: 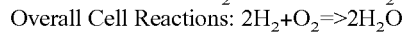 $2H_2 + O_2 \Rightarrow 2H_2O$ Compared to other types of fuel cells, PEMFC's generate more power for a given volume or weight of fuel cell. This high-power density characteristic makes them compact and lightweight. In addition, the operating temperature is less than 100° C., which allows rapid start-up. These traits and the ability to rapidly change power output are some of the characteristics that make the PEMFC the top candidate for automotive power and other applications. Other advantages result from the electrolyte being a solid material, compared to a liquid. The sealing of the anode and cathode gases is simpler with a solid electrolyte, and therefore, less expensive to manufacture. The solid electrolyte is also more immune to difficulties with orientation and has fewer problems with corrosion, compared to many of the other electrolytes, thus leading to a longer cell and stack life.

The performance of a proton exchange membrane fuel cell (PEMFC) is highly dictated by the proton conductivity of the polymer electrolyte membrane. A polymer electrolyte membrane, such as the widely used Nafion® (DuPont) used in fuel cells, requires sufficient amount of water to maintain their proton conductivity. The protonic conductivity increases with the increase of water content. The requirement of sufficient water supply also implies that it is not feasible to use temperatures above 80° C. to 90° C.

Basically, the process of water transport in the polymer membrane involves two pathways. One is that the water is dragged along with protons through the polymer membrane from the anode to the cathode by the electro-osmotic drag which increases with increasing current density and humidity (indicated in FIG. 1 with $H^+ + nH_2O$). The number of water molecules (n in FIG. 1) dragged with each proton is between 1 and 2.5. The poorer the fuel cell performance the more severe the electro-osmotic drag will be. The water drag from the anode to the cathode of the fuel cell is proportional to proton flow and thus this phenomenon increases at higher current density. The other process is that of the back-diffusion of water molecules (indicated in FIG. 1 with the phrase "back diffusion $H_2O$") from the cathode to the anode due to the concentration gradient which is built up by water produced at the cathode and the drive of the electro-osmotic drag. The phenomenon of water back diffusion across the polymer membrane from the cathode to the anode is usually dominant due to the water produced at the cathode. As the sole by-product of the hydrogen-oxygen reaction is water, which occurs at the cathode side (indicated in FIG. 1 with the phrase "$H_2O$ generated"), it is likely that flooding occurs at the cathode side and dehydration occurs at the anode side of the membrane.

Thus, the water balance in the membrane is a complicated issue. It is a major challenge for PEMFC technology. To avoid desiccation of the fuel cell, the traditional method of external humidification of the gases has been applied to practical fuel cell systems. To achieve enough hydration, water is normally introduced into the cell externally by a variety of methods such as liquid injection, steam introduction and humidification of reactants by passing the hydrogen and air through humidifiers prior to entering the cell. Humidification by the last method is relatively easy to handle and therefore, it is the most commonly used technique. In addition to externally introduced water, the water content of a polymer membrane in an operating fuel cell is dependent on several other factors, such as fuel cell operating conditions (temperature, pressure, flow rate and electrical load, etc.), properties of membrane (thickness) and electrode (composition).

However, the external humidification brings a burden to fuel cell systems, especially for those systems having constraints in size and portability. Two feasible methods of alternate humidification of membrane without external humidification were proposed: (1) self-humidifying polymer electrolyte membrane, (2) internal humidification.

Watanabe et al. (Watanabe, M., Uchida, H., Seki, Y. and Emori, M.; J. Electrochem. Soc.; 1996; vol. 143; no. 12; p. 3847-3852) first developed a self-humidifying membrane by recasting the solubilized Nafion ionomer and incorporating in it nano-sized platinum (Pt) and metal oxide particles. The nano-sized particles of Pt and oxides such as $TiO_2$ or $SiO_2$ are both highly dispersed in the thin electrolyte membranes. The platinum and added oxides provide a means for combining $H_2$ and $O_2$ into water, and then retaining the water in the hygroscopic oxides to maintain the water content in the membrane.

The cell using the self-humidifying membrane reported by the researchers showed stable and high performance even under ambient pressure conditions when fed with hydrogen saturated with water at 20° C. and dry oxygen. The output of the cell reached 0.63 W/cm at 0.9 A/cm$^2$. However, this method needs additional Pt in membrane and tedious membrane preparation steps for including those molecules in the membrane.

Several modeling and experimental studies revealed that PEM fuel cell operation with internal humidification using the water generated from electrochemical reaction and the self-water balance in membrane is feasible under restricted operating conditions with regard to gas flow rates and cell temperature or specific electrode/flow field design. For example, Büchi and Srinivasan (Büchi, F. N., Srinivasan, S.; J. Electrochem. Soc.; 1997; vol. 144; no. 8; p. 2767-2772) developed a model for predicting the possibility of operating a PEM fuel cell without external humidification of the gases and experimentally verified the model. In their experiment, a PEM fuel cell with a conventional MEA using Nafion® 115 had demonstrated stable long-term operation over a period of 1800 h at the cell temperature of up to 60° C. with dry reactant gases. However, it was found that the non-humidified cell still performed lower current density (at 0.6 V) than an identical cell with humidified reactants even if the air flow rate and temperature were correctly set. Recently, Chan et al. (Chan, S. H., Xia, Z. T., Wei, Z. D.; J. Power. Sour.; 2006; vol. 158; p. 385-391) have developed a model for a small non-pressurized non-humidified PEM fuel cell stack. In their model, the relationships between conductivity and water loading, water loading and relative humidity, and relative humidity and air stoichiometric number under different constant temperatures (25° C. to 40° C.) were established. The results showed that the air stoichiometric number strongly affects the conductivity of membrane which is performance related.

Due to the aforementioned problems which still exist in the prior art, a need exists for the development of fuel cells in which the water management is further improved for stable operation of fuel cells.

SUMMARY OF THE INVENTION

The present invention provides an electrically conducting composite material for a fuel cell comprising:
an electrically conducting porous base material;
a noble metal catalyst loaded onto the porous base material thereby forming an electrically conducting catalytic porous base material;
hygroscopic particles coated with a proton-conducting polymer wherein the coated hygroscopic particles are incorporated into the electrically conducting catalytic porous base material to form the electrically conducting composite material.

Further provided is an electrically conducting composite material of the present invention wherein the noble metal catalyst may be platinum, gold, iridium, osmium, silver, tantalum, rhodium or ruthenium. In particular the noble metal catalyst may be platinum or a combination of platinum and ruthenium.

Further provided is an electrically conducting composite material of the present invention wherein the electrically conducting porous base material may be graphite, carbon or metal foam.

Also provided is an electrically conducting composite material of the present invention wherein the electrically conducting catalytic porous base material may comprise platinum loaded on carbon particles.

Further provided is an electrically conducting composite material of the present invention wherein the average diameter of the pores of the electrically conducting catalytic porous base material may be in the range of about 50 nm to about 2 μm or is about 1 μm, Further provided is an electrically conducting composite material of the present invention wherein the coated hygroscopic particles may have an average diameter in the nanometer range (nano-particle).

Further provided is an electrically conducting composite material of the present invention wherein the hygroscopic particles may comprise a metal oxide or mixtures of metal oxides, like silica, titanium oxide or $ZrO_2$.

Further provided is an electrode which comprises an electrically conducting composite material according to the present invention, wherein this electrode may further comprise a gas diffusion layer.

In one aspect the gas diffusion layer and the electrically conducting porous base material of the electrically conducting composite material are made of the same or different materials.

In another aspect, the present invention provides a membrane electrode assembly (MEA) comprising an anode, a cathode and a proton-conducting polymer membrane being interposed between the anode and the cathode; wherein at least the anode comprises an electrically conducting composite material of the present invention being in contact on one side with the proton-conducting polymer membrane and a gas diffusion layer being in contact with the other side of the electrically conducting composite material.

Also provided is a membrane electrode assembly (MEA) wherein the proton-conducting polymer membrane comprises hygroscopic particles.

In another aspect the present invention refers to the use of an electrically conducting composite material of the present invention for the manufacture of an electrode, for example an anode and/or cathode.

In still another aspect, the present invention refers to the use of a membrane electrode assembly (MEA) for the manufacture of a fuel cell.

The present invention also provides a method of manufacturing an electrically conducting composite material comprising:
loading the noble metal catalyst onto the electrically conducting porous base material to form the electrically conducting catalytic porous base material;
coating the hygroscopic particles with the proton-conducting polymer; and
incorporating the hygroscopic particles coated with the proton-conducting polymer into the electrically conducting catalytic porous base material to form the electrically conducting composite material.

Further provided is a method wherein the hygroscopic particles coated with the proton-conducting polymer are manufactured by dispersing the hygroscopic particles in a solution of the proton-conducting polymer; wherein the solution of the proton-conducting polymer is prepared by diluting a stock solution of the proton-conducting polymer with an alcohol.

Also provided herein is an electrical device which comprises a membrane electrode assembly (MEA) of the present invention as part of an energy source which is used for a cell phone, a computer, a laptop, a photo camera, a video camera or a vehicle.

BRIEF DESCRIPTION OF THE DRAWINGS

FIG. 1 illustrates the set-up of a fuel cell of the present invention, which consists of a proton exchange membrane (PEM), an anode and a cathode. Both anode and cathode are composed of a gas diffusion layer (GDL) and electrically conducting composite materials. In FIG. 1 the electrically conducting composite material is referred to as catalyst layer. This figure shows the anode where the hydrogen is split into the hydrogen ion ($H^+$) and the electron, and the cathode where the oxygen is supplied to the cathode and combines with the electrons and the hydrogen ions to produce water. The filled circles represent the catalyst, in this case platinum, whereas the empty circles with the solid ring represent the hygroscopic particles covered with the proton-conducting polymer. In FIG. 1 the hygroscopic particles are illustrated as being coated with Nafion®. The PEM is interposed between the anode and the cathode and enbables the protons and water to pass. However, the PEM is not permeable for gases and electrons. The arrows at the left and right side of FIG. 1 show the direction of the gas flows which go in and out of the anode and cathode, respectively. FIG. 1 does not show the way of the electrons which are leaving the fuel cell at the anode and enter it again at the cathode. FIG. 1 also shows a graphical illustration of the Grotthus mechanism.

FIG. 1a is a graphical representation of a humidifying mechanism which illustrates the proton transfer process.

FIG. 2a-d depict TEM micrographs of the size distribution and morphology of Nafion® and silica particles. FIG. 2a shows silica particles in ethanol of which the boundaries can clearly be seen. The size of silica particles in ethanol is distributed within the diameters of about 20 to 30 nm; FIG. 2b shows 3% of silica content in Nafion®; FIG. 2c shows 6% of silica content in Nafion®; and FIG. 2d shows 10% of silica content in Nafion®. Thus, FIG. 2 demonstrates the homogeneous particle distribution in Nafion®.

FIG. 3 displays the water content as function of silica content in Nafion®-silica composite. The x-axis shows the silica content in a Nafion®-silica composite/%. The left y-axis shows the water uptake/g $(H_2O)g^{-1}$. The right y-axis shows the water uptake/mmol $(H_2O)g^{-1}$. In general, the water content of the Nafion®-silica composite layers increases with increasing the silica content in the measured range. The water content is surprisingly increased compared to the water content of similar Nafion®-silica composites referred to in the state of the art (Miyake et al., J. Electrochem. Soc.; 2001; vol. 148; no. 8; p. A898-904) which might be due to the loose structure of formation of Nafion®-silica composite layer by the spraying method used to incorporate the material into the electrically conducting catalytic porous base material of the electrode to form the electrically conducting composite material of the present invention.

FIG. 4a-b demonstrates the performance of the self-humidifying electrodes of the present invention in comparison with the conventional electrode. In FIGS. 4a and 4b, the x-axis in all graphs shows the current density/mA*$cm^{-2}$. The y-axis of the α graph in FIGS. 4a and 4b shows the cell voltage/V whereas the y-axis of the β graph shows the power density/W*$cm^{-2}$. The current-voltage characteristics of single cells using Nafion® 112 (as electrolyte) and self-humidifying anodes with various silica contents in Nafion®-silica composite operated on either humidified or non-humidified gases is shown. FIG. 4a shows the fuel cells working under externally humidified conditions (65/60/60° C. ($T_{anode\ humidifier}/T_{cell}/T_{cathode\ humidifier}$) whereas FIG. 4b shows the fuel cell operation without any external humidification. The cells with 0%, 3% and 6% of silica in anode exhibit similar cell performance over the whole current density range. In contrast, it can be taken from FIG. 4b that the fuel cell without silica in the anode shows the poorest fuel cell performance when the fuel cell operates under non-humidified conditions. This explicitly indicates that adding silica in the electrically conducting composite material of the anode could improve the performance of fuel cell under non-humidified condition.

FIG. 8 displays the general structural composition of Nafion® (DuPont).

FIG. 9 shows the general set up of the electrically conducting composite material of the present invention (referred to as catalyst layer in FIG. 9). GDL means the gas diffusion layer. PEM means the proton-conducting polymer membrane which is interposed between the anode and the cathode and which allows the protons and water to pass but which is not permeable for gases and electrons. This figure illustrates how the hygroscopic particles coated with a proton-conducting polymer are "incorporated" into the pores or voids of the electrically conducting composite material (catalyst layer). It is illustrated that the hygroscopic particles coated with a proton-conducting polymer are not coated on the surface of the catalyst layer but penetrate the catalyst layer in its entirety. This dispersed distribution guarantees a uniform humidification of the electrode. Also shown is the electrically conducting porous base material (in this example carbon) which is loaded with the noble metal catalyst (in this example Pt).

Figure 4B:
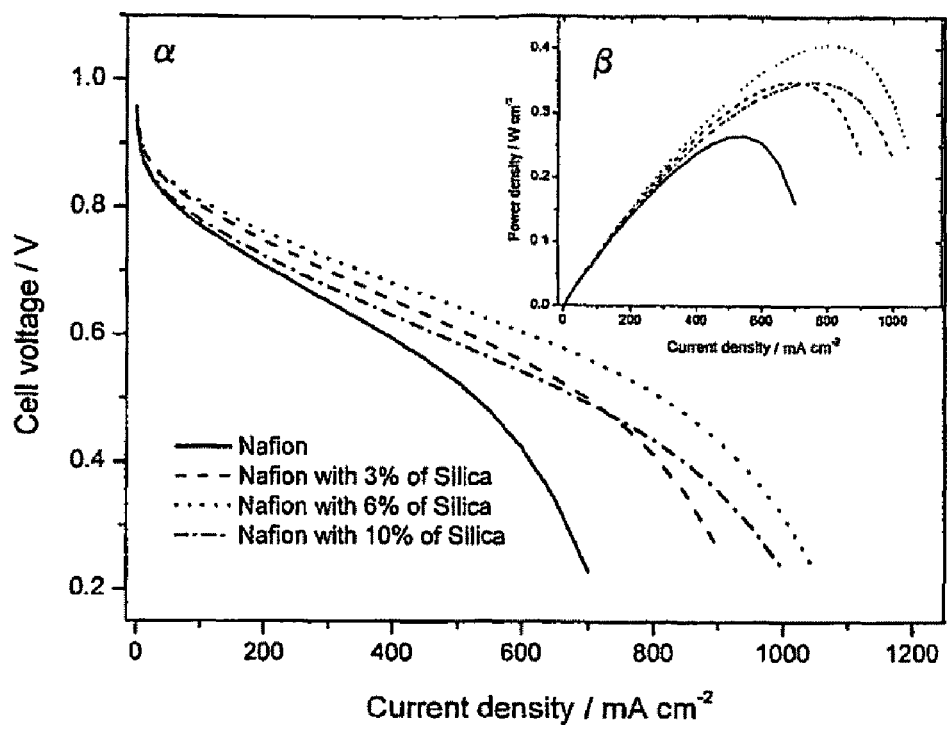

Until today, the exact connection between, in this case carbon (C) and Pt, is not known. Without wishing to be bound by any theory, it is believed that the connection between Pt and C is a physical connection but not a chemical connection. This physical connection may be through Van der Waals force between two particles. On the other hand, the rough surface of carbon particles (like small gap and hole) might also be helpful to absorb Pt particles.

DETAILED DESCRIPTION OF THE INVENTION

Besides the water management in the polymer electrolyte membrane, the water management in the electrode is also very important. The lack of water in the ionomer material in the active layer of an electrode increases the polarization of the electrode. In this regard, the present invention provides an improved design for self-humidification of fuel cells, in particular the electrodes of a fuel cell.

Firstly, the present invention provides an electrically conducting composite material for an electrode comprising an electrically conducting porous base material; a noble metal catalyst loaded onto the porous base material thereby forming an electrically conducting catalytic porous base material; and hygroscopic particles coated with a proton-conducting polymer wherein the coated hygroscopic particles are incorporated into the electrically conducting catalytic porous base material to form the electrically conducting composite material.

The electrically conducting composite material of the present invention can form the active layer of an electrode of a fuel cell which allows securing sufficient humidification of the electrode which in turn allows a better transport of protons from the active layer of an anode into the proton-conducting polymer membrane interposed between the electrodes of the fuel cell.

In the context of the present invention, any electrically conducting porous base material that is available can be used in the present invention. Illustrative examples of suitable electrically conducting porous base materials include, but are by no means limited to, graphite, carbon, carbonized silk body obtained by burning a silk material, porous metal foam (e.g. Ni, Ti or stainless steel). Any metal can be used to form a metal foam as long as the metal used allows a free flow of charge carrier. This electrically conducting porous base material for anode and cathode is usually the same but could also be different.

The average diameter of the pores of the electrically conducting porous base material is not critical as long as the pores of (at least some or most pores) of the base material are able to accommodate the particulate hygroscopic material. In one illustrative example, the average diameter of pores of the electrically conducting porous base material may be in the range of about 50 nm to about 2 μm. In another example, the average diameter of the pores of the porous electrode base material may be about 1 μm.

As mentioned above the size of at least some of the pores of the electrically conducting porous base material should be greater than the average size of the hygroscopic particles coated with the proton-conducting polymer which are used in the present invention to ensure that the hygroscopic particles can be incorporated into the active layer (see FIG. 9) of the electrode (the incorporation can for example be achieved by, using a gun spray method as illustrated in the experimental section of this application). In contrast to the electrodes known in the art, the electrode is not simply coated at the surface with the coated hygroscopic particles referred to herein but "incorporates" them into its porous system so that the electrically conducting composite material is infused with the hygroscopic particles described further below. The electrically conducting composite material is in general about 10-100 μm thick. The coated hygroscopic particles would penetrate the whole electrically conducting composite material of the electrode.

The electrically conducting porous base material of the electrically conducting composite material further comprises or includes a noble metal catalyst loaded onto said porous base material thereby forming an electrically conducting catalytic porous base material. It is also possible that the electrically conducting porous base material used to support the noble metal catalyst in the electrically conducting composite material is made of another material than the material which is used for the gas diffusion layer of an electrode (see further below). For example, it would be possible to use porous metal foam for the gas diffusion layer but to use carbon loaded with the noble metal catalyst as electrically conducting catalytic porous base material of the electrically conducting composite material.

The noble metal catalyst may include platinum, gold, iridium, osmium, silver, tantalum, rhodium, ruthenium and mixtures and alloys thereof, for example platinum/ruthenium.

In one example, the electrically conducting composite material comprises a carbon/platinum mixture with a catalyst loading of 0.4 mg Pt/cm$^2$. In general, the catalyst loading can be in the range of about 0.1 to about 1.2 mg/cm$^2$. By increasing the catalyst loading in the electrode the performance of the fuel cell containing such an electrically conducting composite material is increased.

As already mentioned the coated hygroscopic particles can be incorporated into the electrically conducting catalytic porous base material of the electrically conducting composite material and not simply coated on its surface. To allow those particles to be incorporated into this material the coated hygroscopic particles have usually an average diameter in the nanometer range (nano-particles). The average diameter of these hygroscopic particles can be in the range of about 5 nm to about 1000 nm (999.99 nm). In another example the average diameter of these hygroscopic particles can be in the range of about 25 nm to about 35 nm, wherein between 2 nm and 5 nm of these 25 nm to 35 nm are made of the proton-conducting polymer with which these hygroscopic particles are coated. In one example, the average diameter of the hygroscopic particles is about 25 nm to 35 nm and 5 nm of the 25 nm to 35 nm are made up of the proton-conducting polymer, i.e. the average diameter of the hygroscopic particles is about 20 nm to about 30 nm. The average diameter of the proton conducting polymer membrane coating these hygroscopic particles is in general about 0.1 nm to about 5 nm. In one example the average diameter is about 2 nm to about 5 nm but can also be higher.

The particles comprise a hygroscopic material. A hygroscopic material is a substance which attracts water molecules from the surrounding environment through either absorption or adsorption. Some substances are so hygroscopic that it eventually dissolves in the water it absorbs: this property is called deliquescence. Deliquescent materials are also encompassed by the term "hygroscopic" as used here and are substances (mostly salts) which have a strong affinity for moisture and will absorb relatively large amounts of water from the atmosphere if exposed to it. Examples of deliquescent materials are for example also mentioned in US 2005/0053821.

Hygroscopic particles referred to herein can comprise or consist of a metal oxide or a material selected from the group consisting of sodium formate, sodium ethyl sulfate, magnesium acetate, silicon oxide, titanium oxide, chromium oxide, zinc chloride, calcium chloride, magnesium chloride, lithium chloride, calcium bromide, potassium bisphosphate, potassium acetate, phosphorous oxide, ammonium acetate, sodium acetate, sodium silicate, potassium silicate, magnesium sulfate, magnesium oxide, calcium oxide, cerium oxide, silicon oxide zeolite, zirconia, tungsten trioxide, barium oxide, cobalt chloride, bentonite, montmorillonite clay, silica gel, molecular sieve, monohydric compounds, polyhydric compounds, metal nitrate salt, sodium ethyl sulfate organic salt, polyethylene glycol, and combinations thereof. In one illustrative example, titanium oxide, or $ZrO_2$ or silicon oxide (silica) is used as material for the hygroscopic particles.

The proton-conducting polymer which covers the hygroscopic particles serves the function of transporting protons from the catalyst, such as platinum (Pt), located in the electrically conducting catalytic porous base material which forms the electrically conducting composite material into the polymer electrolyte membrane of a fuel cell. The hygroscopic particles which are covered by this proton-conducting polymer serve the function of water absorption/retention. When the water produced by electrochemical reaction at the cathode of the fuel cell back-diffuses from the cathode to the anode as described in the introductory part of this application, it is absorbed by the hygroscopic particles. The absorbed water thus partly provided also for the back-diffusion process is also beneficial to hydrate the proton-conducting membrane (PEM). The hygroscopic particles at the cathode thus help to retain water when using, for example, dry air as the oxidant. With hygroscopic particles in the cathode, a constant concentration gradient would establish across the fuel cell bringing the advantage of replenishing water by back diffusion from the cathode to the anode through the membrane, which not only hydrates the membrane and its interface with anode, it also helps to "recycle" the water generated at the cathode solving the flooding problem at the cathode mentioned in the introductory part of the application.

Since the absorption/retention between the hygroscopic material and the water molecules can form a strong bond by Van der Waals force, the water absorbed by the hygroscopic particles (see the graphical illustration of it in the cathode and anode shown in FIG. 1) will not so easily be desorbed even at elevated temperatures. Thus, the electrically conducting composite material of the present invention associated with water could form proton transport vehicle and conduct the protons following Grotthus mechanism produced at the catalyst in the electrically conducting composite material under non-humidification condition (the Grotthus mechanism postulates that polar water molecules could align themselves in long chains from cathode to anode, thus allowing protons to easily jump between neighboring water molecules, thereby making protons highly mobile in solution (see FIG. 1a)).

The proton-conducting polymer which is used for coating the hygroscopic particles and/or as material for the proton conducting polymer membrane (also referred to as "polymer electrolyte membrane" (PEM)), which is interposed between the electrodes of a fuel cell, is characterized by its ability to conduct hydrogen ions (protons) but not electrons as this would in effect "short circuit" the fuel cell. The electrolyte membrane is also impermeable for gas and resistant to the reducing environment at the cathode as well as the strong oxidative environment at the anode. Basically, any proton-conducting polymer can be used for the purposes of the present invention, as long as it does not interfere with the action of the hygroscopic particles.

One example for suitable proton-conducting polymers are polymers which can be selected from the group represented by the formula (I):

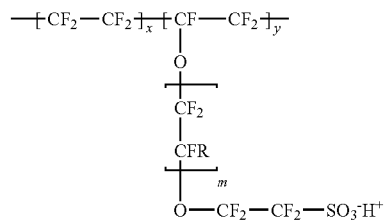

where x and y are integers selected from 1 to 100,000, m is an integer selected from 0 to 10 and R is a functional group selected from the group consisting of H, F, Cl, Br, I, and $CH_3$; a blend of the proton-conducting polymer represented by formula (I) with a second polymer and combinations thereof.

In another example, the proton-conducting polymer is characterized by comprising or consisting of a structure having a fluorinated backbone which has recurring pendant groups attached thereto and represented by the general formula (II):

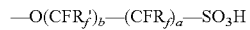

where a=0 to 3, b=0 to 3, a+b=at least 1, $R_f$ and $R_f'$ are independently selected from the group consisting of a halogen and a substantially fluorinated alkyl group having one or more carbon atoms; a copolymer of the proton-conducting polymer represented by formula (II); a blend with a second polymer and combinations thereof.

In a further example, the proton-conducting polymer comprises a repeating unit represented by the following formula (III):

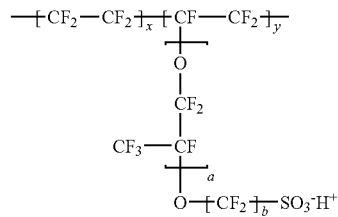

where a is 0, 1, or 2, b is 2 or 3, x and y are positive integer numbers and x/y ratio is of 10 or less; a copolymer of the proton-conducting polymer represented by formula (III); a blend with a second polymer and combinations thereof.

In one example, the proton-conducting polymer is the perfluorosulfonic acid (PFSA) Nafion® (DuPont) as represented by the formula shown in FIG. 8. The material, Nafion® consists of three regions: (i) a polytetrafluoroethylene (PTFE, DuPont's Teflon™)-like backbone, (ii) side chains of —O—$CF_2$—CF—O—$CF_2$—$CF_2$— which connect the molecular backbone to the third region, and (iii) ion clusters consisting of sulfonic acid ions. When the membrane becomes hydrated, the hydrogen ions in the third region become mobile by bonding to the water molecules and moving between successive sulfonic acid groups (proton movement by Grotthus mechanism, supra). A fully hydrated Nafion® membrane contains a water phase similar to bulk water (as assessed by its dielectric properties). The phase separation is caused due to the extreme hydrophobicity of the perfluorinated polymer with the extreme hydrophobicity of the terminal sulfonic acid group of the Nafion® (see FIG. 1a). There are two advantages to the use of PFSA membranes in fuel cells. First, because the structure is based on PTFE backbone, perfluorosulfonic acid (PFSA) membranes are relatively strong and stable in both oxidative and reductive environments. Second, the protonic conductivities achieved in a well-humidified PFSA membrane can be as high as 0.2 Scm$^{-1}$ at PEM fuel cell operating temperatures. The high electronegativity (i.e. electron affinity) of the fluorine atom, bonded to the same carbon atom as the $SO_3H$ group makes the sulfonic acid a superacid (similar to trifluoromethane sulfonic acid).

Suitable proton-conducting polymers which can be used in the present invention include, but are not limited to, polytetrafluoroethylene (PTFE), Nafion® NRE-212 membrane, Nafion®/polyaniline, sulfonated polysulfone, sulfonated poly(ether sulfone), poly(vinylidene)fluoride (PVDF), Nafion®/PTFE, Nafion®/Krytox, Poly(vinylidene)fluoride-chloro tetrafluoro ethylene, (PVDF-chlorotrifluoroethylene (CTFE) copolymer, poly(ethylene glycol), poly(ethylene glycol)/(4-dodecylbenzene sulfonic acid (PEG)/(DBSA), sulfonated styrene-(ethylene-butylene)-sulfonated styrene (SEBSS), poly-(ethyleneoxide)s (PEO), polyvinyl alcohol (PVA), poly-vinylidene fluoride/poly-acrylonitrile (PVDF/PAN), PVDF-g-PSSA (poly(styrene sulfonic acid), sulfonated poly(ether ether ketone) (SPEEK), sulfonated polyethersulfone cardo, sulfonated poly(acrylene ether sulfone), disulfonated poly(arylene ether sulfone), disulfonated poly (arylene ether sulfone), Nafion®/Teflon®, Nafion®/polyphenylene oxide (PPO), sulfonated polyether ketone (SPEEK)/polybenzimidazole, polybenzimidazole (PBI), poly(vinylalcohol) (PVA), polyethyleneimine (PEI), polystzrene grafted poly(ethylene-alt-tetrafluoroethylene), poly-vinylidene fluoride (PVDF), and poly(fluorinated arylene ether)s. Different kinds of Nafion® such as Nafion N1135 or N112 or N101 (all available from DuPont) can also be used. A summary of inorganic-organic composite membranes which can be used as proton-conducting polymer for the manufacture of the electrically conducting composite material and the membrane electrode assembly (MEA) of the present invention are listed in Table 1 (pages 60 to 65) of the article of Viswanathan, B. and Helen, M. (2007; Bulletin of the Catalysis Society of India, vol. 6, p. 50-66).

An exemplary combination of a hygroscopic material with a proton conducting polymer is the use of silica coated with Nafion®. This combination of materials has been used exemplarily for experimental characterization purposes as can be seen in the experimental part of this application. In addition, other types of Nafion® have also been used, namely Nafion® N1135, N112 and N101 (all from DuPont).

In general, the content of the hygroscopic material in the proton-conducting polymer is in a range of about 0.1% to about 100% (w/w). For example, the content is about 0.1% to about 6% (w/w). In another example, the content is about 3% to about 6%. In case the electrically conducting composite material of both electrodes include the coated hygroscopic particles, the content of the hygroscopic material in the proton-conducting polymer can be different for both electrodes (e.g. 2% at the cathode and 4.5% at the anode, or vice versa). In this regard, when silica particles are used, it is noted that with a higher percentage of silica (i.e., 10%) a network structure of the sample is formed and may show some agglomerations in various locations (FIG. 2d). This could contribute to a non optimal distribution of the Nafion®-silica nano-composite in the electrically conducting composite material for electrode protonization and may cause the reduction of electrode performance. In the case of a silica content above 6% the conductivity may be decreased, however can of course still be useful and such higher content are still encompassed in the present invention. In this regard, these results also show the usefulness of coated hygroscopic particles in the electrically conducting composite material of the present invention.

The present invention further refers to an electrode of a fuel cell comprising an electrically conducting composite material of the present invention. Besides the electrically conducting composite material the electrode further comprises a gas diffusion layer. It is possible that the gas diffusion layer and the electrically conducting porous base material of the electrically conducting composite material are made of the same or a different material. The gas diffusion layer is generally made of carbon paper or cloth through which reactants and reaction products diffuse in and out of the fuel cell. However, other materials are also possible as long as they allow the transport of reactants and reaction products of a fuel cell.

The electrode of the present invention can for example be constructed as illustrated in FIG. 1. In this Figure it is illustrated that the electrically conducting composite material comprises an electrically conducting catalytic porous base material which forms a catalyst layer. This catalyst layer is attached on the one side to an PEM and on the other side to a gas diffusion layer. The electrically conducting catalytic porous base material in this example comprises further hygroscopic particles coated with a proton-conducting polymer wherein said coated hygroscopic particles are incorporated into said catalyst layer.

The electrically conducting composite material of the present invention can also be used for the manufacture of an electrode described above or more particular an anode as well as a cathode and thus finally for the manufacture of a membrane electrode assembly (MEA), the core component of a PEMFC.

A membrane electrode assembly (MEA) of the present invention comprises an anode, a cathode and a proton-conducting polymer membrane being interposed between said anode and said cathode, wherein at least said anode comprises an electrically conducting composite material of the present invention being in contact on one side with said proton-conducting polymer membrane, and a gas diffusion layer being in contact with the other side of said electrically conducting composite material. In another aspect also the cathode comprises an electrically conducting composite material of the present invention being in contact on one side with said proton-conducting polymer membrane, and a gas diffusion layer being in contact with the other side of said electrically conducting composite material.

However, as mentioned before, it is also possible that only the cathode or the anode and the cathode together comprise an electrically conducting composite material of the present invention. The proton-conduction polymer membrane (PEM, see FIG. 1) of such an MEA can be made of a different or the same proton-conduction polymer which is used to coat the hygroscopic particles used in the electrically conducting composite material of the present invention.

Besides the fact that the incorporation of hygroscopic particles and catalyst in the PEM as described in the prior art (see e.g. Watanabe et al., supra) necessitates additional catalyst in membrane and tedious membrane preparation steps, it is also possible that not only the electrically conducting composite material comprises non-coated or coated hygroscopic particles but also the PEM, thus further increasing the self-humidifying effect in the whole fuel cell. In such a case the PEM can also include a catalyst, like platinum or any other suitable catalyst or catalyst combination mentioned above.

The use of the electrically conducting composite material of the present invention in fuel cells allows to avoid the need of complex preparation steps for the proton-conducting polymer membrane which is interposed between the anode and the cathode as described in the prior art. The complex preparation of the proton-conducting polymer membrane comprises doping of hygroscopic particles into the proton-conducting polymer membrane by hydrolysis in sol gel reaction and subsequent rinsing and drying of the membranes obtained, which is a much more complex process than preparing the electrode composite material of the present invention.

FIG. 3 demonstrates the increased humidification of the MEA when using hygroscopic particles coated with a proton-conducting polymer in the electrically conducting composite material of an electrode. As higher the silica contents in the electrically conducting composite material of the present invention as higher the water uptake in this composite material. The fuel cells of the present invention also show a similar current even under non-humidifying conditions, i.e. when using for example dry air (see FIG. 4b). The inventors demonstrated that with the coated hygroscopic particles in the active layer of the electrically conducting composite material, the electrode can hold more water than, for example, pure Nafion® material under non-humidification conditions, i.e. when dry air, not artificially humidified air, is used for fuel cell operation. Using the electrically conducting composite material of the present invention, not only the over-potential of anode but the membrane resistance can be reduced by adding, for example, silica into the Nafion® material in the anode for increasing the cell performance at non-humidification conditions.

Figure 5:
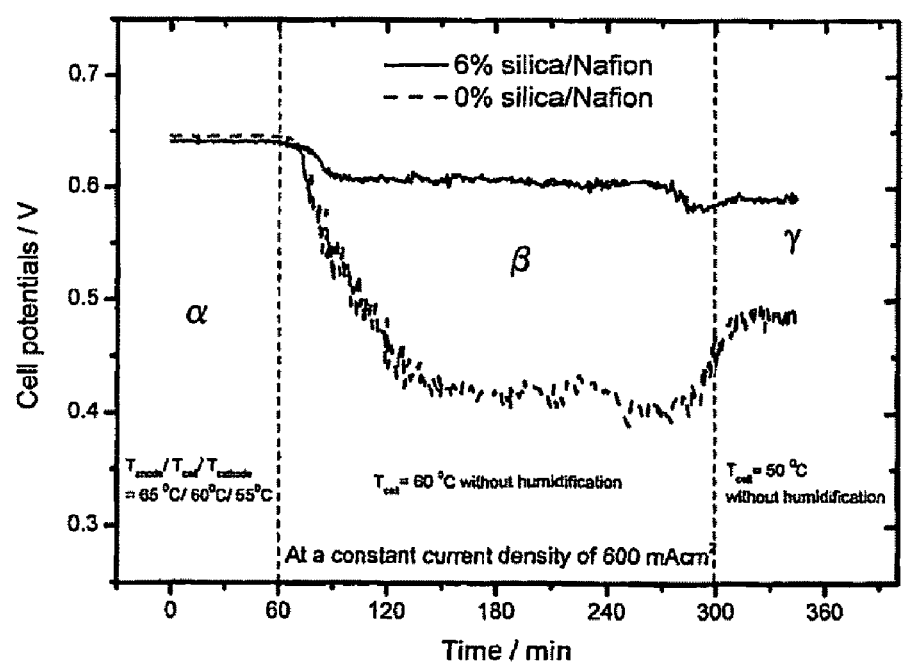
FIG. 5 shows the results of fuel cell stability test, which was conducted using the self-humidifying anode added with silica contents of 6% (in comparison with an anode without adding silica) at the cell temperature of 60° C./50° C. under non-humidifying condition for both $H_2$ and air feedstock. The area designated with a shows the values recorded during a period of 1 h which served to achieve a stable fuel cell performance under humidifying condition at 65° C./60° C./60° C. ($T_{anode\ humidifier}/T_{cell}/T_{cathode\ humidifier}$). Area β shows the results of the following stability testing, which was carried out under the non-humidifying condition at a cell temperature of 60° C. for 4 h. Finally, area γ shows the results of the testing phase carried out a cell temperature of 50° C. The fuel cell with the self-humidifying anode of the present invention also shows a higher voltage at 60° C. than that at 50° C., while the cell with a normal anode displays a higher voltage at 50° C. than that at 60° C. It indicates that the fuel cell with the self-humidifying anode has achieved a significant self-humidifying effect.

The inventors also demonstrated, that the fuel cell with, for example, the self-humidifying anode demonstrates much higher stable voltage at a constant current density than that of the fuel cell with a normal anode (FIG. 5). From the experiments carried out by the inventors, it can be concluded that the fuel cell with a self-humidifying anode has much higher stability at enhanced cell temperature than the fuel cell with a normal anode.

Further disclosed herein is a method of manufacturing an electrically conducting composite material of the present invention comprising:
  loading the noble metal catalyst onto the electrically conducting porous base material to form the electrically conducting catalytic porous base material;
  coating the hygroscopic particles with the proton-conducting polymer; and
  incorporating the hygroscopic particles coated with the proton-conducting polymer into the electrically conducting catalytic porous base material to form the electrically conducting composite material.

Firstly, the solution of the proton-conducting polymer to be mixed with the hygroscopic particles is prepared by diluting a stock solution of the proton-conducting polymer, such as a 5% to 10% stock solution, 3 to 5 fold with an alcohol, such as isopropanol, to the desired end-concentration of, for example, about 1 to 1.6%. This diluted solution of the proton conducting polymer is than mixed with the hygroscopic particles, e.g. stirred in an ultrasonic bath to allow a uniform dispersion of the particles in the solution of the proton-conducting polymer. In the mixing step, the content of the hygroscopic particles is adjusted to be within the desired range of, e.g. 3, 3.5, 4, 4.5, 5, 5.5 or 6% (or even higher if desired).

Another part of the method includes preparation of the gas diffusion layer of the electrode of the present invention. Therefore, an electrode backing made of a porous (gas diffusion) layer (GDL) which is filled with a carbon powder and optional a polymer, such as PTFE or fluorinated ethylene propylene (FEP) is provided. The electrically conducting composite material can then be formed on this gas diffusion layer by painting, for example, a carbon/platinum/PTFE mixture (e.g. 20% wt. % Pt/C). The electrode thus obtained is then dried and sintered before it is used.

To incorporate the final solution of hygroscopic particles coated with the proton-conducting polymer into this electrode, the solution is deposited onto the surface of the electrode, for example by gun-spraying, to form the protonized electrode and protonized/self-humidifying electrode, respectively (see FIG. 9, catalyst layer). After drying the electrode thus produced, the electrode was hot pressed onto both sides of a proton-conducting polymer membrane (PEM) shown in FIG. 1 at, for example, about 130 to about 140° C. and 50 kg/cm$^2$ for 2 min.

The present invention also refers to the use of a membrane/electrode assembly (MEA) mentioned above for making a fuel cell as energy source that can be used in electrical devices such as a cell phone, laptop, a 3G phone, a photo camera, a video camera or in an vehicle, like a car.

The inventions illustratively described herein may suitably be practiced in the absence of any element or elements, limitation or limitations, not specifically disclosed herein. Thus, for example, the terms "comprising", "including", "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the inventions embodied therein herein disclosed may be resorted to by those skilled in the art, and that such modifications and variations are considered to be within the scope of this invention.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

Other embodiments are within the following non-limiting examples and claims. In addition, where features or aspects of the invention are described in terms of Markush groups, those skilled in the art will recognize that the invention is also thereby described in terms of any individual member or subgroup of members of the Markush group.

EXPERIMENTS

MEA Preparation

An carbon powder-filled gas diffusion layer consisting of PE-704 carbon paper (SGL, SIGRATHERM®) filled with the mixture of Vulcan® XC-72R carbon powder (Cabot Co.) and PTFE (60 wt. %, Aldrich) was chosen as the electrode backing. The mass ratio of carbon to PTFE in the carbon paper was 2:1. The carbon loading in the carbon paper was 6 mg/cm$^2$. The catalyst layer contains a 20 wt. % Pt/C catalyst from E-TEK (Pt catalyst supported on Vulcan XC-72) and 60% PTFE emulsion. It was formed by painting method. Alternative to the painting method, the sprinkling method can be used to form the catalyst layer. The E-TEK electrode GDE-LT could also be used for the purposes of the present invention.

For the gas diffusion layer (GDL) a paste composed of carbon powder and PTFE was prepared by dispersing Vulcan XC-72 carbon powder into anhydrous ethanol (the mass ratio of carbon powder to ethanol is 1:20) in an ultrasonic tank with a frequency of 25 kHz followed by adding PTFE emulsion into the dispersion drop by drop under gently stirring. Afterwards, the paste was pressed into the PTFE treated carbon paper to form the GDL by a plastic blade and the thickness of the composite structure was maintained the same as that of the carbon paper. These composite structures were finally dried and sintered at 340° C. for 1 hr for making the catalyst layer.

To prepare the electrically conducting catalytic porous base material, a homogeneous suspension of the catalyst, for example Pt, with PTFE emulsion in isopropanol was made by mixing and stirring the mixture in an ultrasonic bath at room temperature for 0.5 hr and then kept at a low temperature for 1 h. Use of an ultrasonic bath yields a better dispersion of the particles in suspension. The suspension was then coated onto one side of GDL by using a painting method. The layer was air-dried at room temperature for 1 hr, followed by a heat treatment at 240° C. for 0.5 h under the flowing of inert gas to remove the dispersion agent contained in the PTFE emulsion and finally sintered at 340° C. for 0.5 h. Both the anode and cathode were prepared in the same manner. In one example, the catalyst loading, for example Pt catalyst, on the electrode was 0.4 mg/cm$^2$. The catalyst loading, for example with Pt, on the electrically conducting catalytic porous base material, can be in the range of about 0.1 to about 1.2 mg/cm$^2$. In general, a higher catalyst loading increases fuel cell performance since the active-site in the electrode is increased by adding more catalyst. At the same time, high catalyst loading also increases the thickness of the electrically conducting catalytic porous base material. The catalyst near the catalyst/membrane interface in about 10 μm is effective for a fuel cell reaction. The PTFE content in the electrically conducting catalytic porous base material can be in the range between about 5 to 50% (w/w). In one example the content was about 20% (w/w) (based on the catalyst mass). The function of PTFE in the electrically conducting catalytic porous base material is that of a binder increasing hydrophobic pores in the electrode for fast gas diffusion. Instead of PTFE fluorinated ethylene propylene (FEP) could also be used.

Manufacture of the Nafion®-Silica Suspension

To control a correct composition without introducing impurities, the silica powder was used in the preparation of the Nafion®-silica suspension in this experiment instead of using in situ method (i.e., the nano-sized silica particles directly form in the Nafion solution). The nano-sized silica powder was first prepared by hydrolysis/condensation reaction from tetraethoxysilane (TEOS), deionized H$_2$O and HCl solution at the room temperature followed by drying the product in vacuum oven at 105° C. The sample as prepared was then dispersed in the Nafion® solution which was prepared by diluting 5% Nafion® solution (DuPont) 3 to 5 folds to the desired end concentration of about 1 to 1.6% with isopropanol, by mixing and stirring in an ultrasonic bath at room temperature for 1 h to form the Nafion®-silica suspension for use in the self-humidified electrode. The silica content in the Nafion® solution (the ratio of silica to dried Nafion® polymer) varied from 3%, to 10% for the study of the effect of silica content on the extent of self-humidification.

Application of Nafion® and Nafion®-Silica Suspension on the Electrode

The main purpose in this example is to investigate the effect of the self-humidified anode on the fuel cell performance under the condition of insufficient external humidification. Thus, the diluted Nafion® solution and Nafion®-silica suspension were gun-sprayed into the surface of the electrically conducting catalytic porous base material or impregnated to form the protonized electrode and protonized/self-humidifying electrode, respectively. After the Nafion®-silica suspension spray step, the electrodes were placed in a vacuum oven at 80° C. and allowed them to dry for 1 h. The Nafion®-silica suspension incorporation was 1 mg/cm$^2$ (based on Nafion polymer weight) for all the electrodes in the study. In general the Nafion®-silica suspension incorporation is about 0.4-2.0 mg/cm$^2$. In general, a low amount of proton conducting polymer could provide less proton conducting paths in the electrically conducting composite material, giving a high activation polarization to a fuel cell, but the excess amount of a proton conducting polymer in the electrically conducting composite material would form a film on the external surface of the electrode, giving an additional contribution to the overall resistance of a fuel cell.

Nafion® series, N1135, N112 and N101 (DuPont) were pretreated to remove surface impurities and various kinds of cations before they can be used. The procedure of membrane pretreatment is described elsewhere [Du et al., 2001, Phys Chem Chem Phys, 3, 3175-3179]. A pair of the anode and cathode described above was then hot pressed in a hot-press machine onto both sides of the Nafion® membranes for 2 min at 130-140° C. with a pressure of 50 kg/cm$^2$.

Characterization and Performance Evaluation Methods

A single cell with electrode area of 20 cm$^2$ and mesh flow field was used in the evaluation of fuel cell performance enhanced by self-humidifying anodes. Steady-state current-voltage measurements were first conducted on each sample at 60° C. and 0.1 bars (gauge pressure) of hydrogen at the anode and air at the cathode under humidification condition, and then measured under not humidified conditions. The hydrogen pressure was controlled by Mini high-purity pressure regulator of Cole-Parmer (Max. output pressure of 1 bar) and the back pressure gauge (0-1 bar). The gases used have been high purified gases, i.e. for example oxygen content of 99.99%. The hydrogen pressure was controlled at 0.1 bars. The gas flow directions on both the anode and cathode are of counter-flow mode. The reactant gas flow rates were kept at the stoichiometric values of 1.15 times for H$_2$ and 2 times for air operating fuel cells at 1 A/cm$^2$. The testing was carried out using Arbin electronic load system (FCTS Electronic Load Module (ELOAD) from Arbin Instruments).

The measurements of proton conductivity were carried out on Nafion®-silica films to obtain a reference for the self-humidifying electrode with the varying silica contents from 0 to 10% sandwiched between two Pt disks by press at room temperature in the frequency range of 0.01-100 kHz. The potentiostat/galvanostat (model 273, EG&G) equipped with a lock-in amplifier (model 5210, EG&G) was used in this experiment. The films resistance was obtained by extrapolating the impedance data to the real axis on the high frequency side (the impedance data were corrected for the contribution of the empty and short-circuited cell).

The water uptake of Nafion®-silica composite was determined by the gravimetric analysis. The sample was prepared by spraying the Nafion-silica suspension onto one side of a glass plate with the dimensions of 4×4 cm followed by drying in a vacuum oven at 80° C. for 1 h. The silica contents in the samples are 0%. 3%, 6% and 10%. The Nafion® loading on each sample was 1 mg/cm². The water uptake of Nafion®-silica composite layer is referred to the liquid water accumulation in the sample and is expressed as $$\Phi_W = \frac{W_{water}}{W_{sample}} \quad \text{(Formula IV)}$$

where $W_{water}$ is the weight of liquid water accumulated in each sample, and $W_{sample}$ is the weight of the Nafion®-silica composite layer when subtracting the weight of the coated glass plate with Nafion®-silica from the glass plate. In order to measure the $W_{water}$, the sample was first dried in a vacuum oven at 105° C. for 4 h to obtain the dry weight $W_{dry}$ of sample using an electronic balance (Sartorius Basic balance, sensitivity of 0.1 mg), and then immersed in the hot water at 80° C. for 4 h to obtain the wet weight $W_{wet}$ of sample. The $W_{wet}$ was determined by removing the sample from water, and removing surface water using tissue paper (this was carried out as quickly as possible to avoid weighing errors). The weight of water, $W_{water}$, is obtained from the difference between the wet and dry weights of sample, $W_{wet}-W_{dry}$. With each samples, five parallel analyses were performed.

The morphology of silica particles in the Nafion® solution was examined by a transmission electron microscope (TEM) (JEM 2010, JEOL) at 100 kV. Samples of the silica dispersed in ethanol and Nafion®/silica suspension were dried out on copper grids for direct observation.

Characterizations of Nafion-Silica Nano-Composite

TEM images of Nafion-silica composite: The size distribution of silica particle and the morphology of nano-silica particles dispersed in Nafion® solution with different nanoscale silica weight percentage were observed by TEM and illustrated in FIG. 2. It can be seen that the size of silica particles in ethanol is distributed within the diameters of about 20 to 30 nm (FIG. 2a). The clear boundaries of silica particles are also observed. For the Nafion®-silica suspensions, such as silica weight percentage of 3% and 6%, silica particles were homogeneously dispersed and embedded in the Nafion® matrix (FIGS. 2b and 2c). The composite particle size of the silica embedded in Nafion® ranging from about 25 nm to 35 nm is a little bigger than that of pure silica in ethanol (FIG. 2a). It is clear that the increase in diameter of the silica in Nafion® solution is due to the covering of Nafion® film on the surface of silica particles.

However, with higher percentage of silica (i.e., 10%) the network structure of the sample is formed and shows some agglomerations in various locations (FIG. 2d). It could contribute to a poor distribution of the Nafion®-silica nano-composite in the electrically conducting composite material for electrode protonization, causing the reduction of electrode performance. In summary, the silica in Nafion®-silica suspension could form Nafion®-silica nano-composite particle as observed in the TEM images. This is beneficial to achieve a wetting effect on the Nafion® covering the surface of silica particles when they are applied to the anode and/or cathode under operating condition.

Water uptake of Nafion®-silica composite: The water uptake of Nafion®-silica composite as a function of silica content is shown in FIG. 3. The water content of the Nafion®-silica composite layers increases from 0.43 to 0.79 with increasing the silica content in the measured range of 0 to 10%. The values (43% for pure Nafion® and 67% for 6% of silica content) of water absorption in this experiment are much higher than those (32% for pure Nafion® and 39% for 4-5% of silica content) reported by Miyake et al. [2001, *J. Electrochem. Soc.* 148(8), A898-A904]. Without being bound to any theory, the higher water absorption of the composite samples in this experiment might be attributed to the loose structure of formation of Nafion®-silica composite layer by the spraying method, thus more water absorption was obtained.

Proton conductivity of Nafion®-silica composite: The conductivity of Nafion®-silica composite films under the different testing environments is reported in Table 1.

TABLE 1

Proton conductivity (Scm⁻¹) measured on Nafion ® and Nafion ®-silica composite films

| Testing condition | 0 wt % of SiO$_2$ | 3 wt % of SiO$_2$ | 6 wt % of SiO$_2$ | 10 wt % of SiO$_2$ |
|---|---|---|---|---|
| In the water at the room temperature | 0.0207 | 0.0177 | 0.0164 | 0.013 |
| In RH of 75% at the room temperature | 0.0083 | 0.0101 | 0.012 | 0.0097 |

From the table, it can be seen that the conductivities of Nafion®-silica composite films are dependent on the testing environment. Under fully hydrated condition (the samples immerged in the liquid water at the room temperature), the addition of silica particles in Nafion® material decreases the conductivities of Nafion®-silica composite films, especially for high silica content, even if the water content in Nafion®-silica composite film increases with increasing in the silica content. These results appear to be in conflict with the Grotthus mechanism—transport of proton by a hopping mechanism contributes more to conduction at high water content. This could be explained by the introduction of silica particles in the Nafion® material which might form a loose structure of Nafion®-silica composite. Moreover, the agglomeration of silica in high content, as shown in the TEM micrograph in FIG. 2d, may destruct the formation of continuous Nafion® layer over the silica particles causing the proton conductivity to decrease further. On the contrary, under practice conditions, i.e. at room temperature and RH of 75%, Nafion®-silica composite films have higher conductivities than that of Nafion® film and show increased conductivities with the increase of the silica content from 0% to 6%, but decreased conductivity when further increase in silica content. This can be explained that the silica as hygroscopic agent would absorb the moisture from the surroundings and release the water to wet the Nafion® film which covers the silica particles to improve the Nafion® film conductivity. This phenomenon obeys the Grotthus mechanism of proton transport, as mentioned above. The decrease in the conductivity at the high silica content might result from the same reason as that under fully hydrated condition described above.

Performance of PEMFC's with Various Silica Contents in Anodes Under Humidified and Dry Reactant Gas Conditions FIG. 4 shows the current-voltage characteristics of single cells using Nafion® 112 as the electrolyte and self-humidifying anodes with various silica contents in Nafion®-silica composite operated on either humidified or non-humidified gases. Under the externally humidifying condition at 65/60/60° C. ($T_{anode\ humidifier}/T_{cell}/T_{cathode\ humidifier}$), the cells with 0%, 3% and 6% of silica in anode exhibit similar cell performance over the whole current density range, i.e., cell voltage of 0.7 V at about 450 mA/cm² and the maximum power density of about 0.47 W/cm². However, the cell with 10% of silica in anode shows the poorest performance, i.e., cell voltage of 0.65 V at about 450 mA/cm² and the maximum power density of about 0.41 W/cm² (FIG. 4a). The results indicate that the silica content has little effect on the anode and hence the cell performance when the quantity is low and humidity is high. It is revealed that the Nafion®-silica nano-composites, as clearly observed in the TEM image (FIG. 2c), function like the proton conductor similar to the Nafion® material in the electrically conducting composite material and provide the passageways for proton transport from the catalyst sites to the membrane. However, with high percentage of silica in the anode, i.e., 10%, the performance of the cell is impaired likely due to the agglomerations of silica particles in the electrically conducting composite material, thus causing reduced proton conductivity of Nafion®-silica nano-composite. This is supported by the evidence of the result in Table 1.

FIG. 4b shows the performances of cells with self-humidifying anodes operating at cell temperature of 60° C. without external humidification. It is found that the performances of the cells increase with the increase in the silica to Nafion® ratio in anodes from 0 up to 6%, i.e., the cell voltage increases from 0.56 to 0.66 V at about 450 mA/cm² and the maximum power density enhances from 0.26 to 0.4 W/cm². However, further increase in silica to about 10% causes deteriorated performance as illustrated by the decreased cell voltage from 0.66 to 0.61 V at the same current density and the decreased maximum power density from 0.4 to 0.35 W/cm². In contrast, the cell without silica in the anode shows the poorest fuel cell performance. This explicitly indicates that adding silica in the electrically conducting composite material of the anode could improve the performance of fuel cell under non-humidified condition.

Without wishing to be bound by any theory, it can be explained that the addition of silica in the electrically conducting composite material of the anode would improve the water uptake of the Nafion® material in the electrically conducting composite material of the anode so that the proton conductivity could be increased under a low humidity. This is in good agreement with the results on the characterizations of water uptake and proton conductivity for Nafion®-silica composite as described above. It can provide evidence that the Nafion®-silica composite in the electrically conducting composite material (of anode) would hold more water than the pure Nafion® material under the non-humidification condition. The water absorbed in the Nafion®-silica composite mainly comes from the water back-diffusion through the membrane from the cathode to the anode (some water may be formed from the recombination of permeated oxygen and hydrogen at the anode). The membrane would simultaneously be self-humidified by the water transported through it due to the back-diffusion. Thus, not only could the overpotential of anode but the membrane resistance be reduced by adding silica into the Nafion® material in the anode for increasing the cell performance at the non-humidification condition. On the other hand, the added silica as a hydroscopic agent would help in retaining the water especially when considerable back diffusion of water from the cathode to the anode occurs under no/low load operations. This effect is particularly profound when ultra thin membrane is used because of reduced number of water molecules per proton drag and the large concentration gradient of water across the ultra thin membrane. The silica content and its distribution in the catalyst layer also play an important role in the improvement of fuel cell performance. Though, the increase in the silica content in the electrically conducting composite material of the anode allows higher chances for Nafion® to come in contact with silica particles and arrives in good distribution throughout the electrode for increased catalyst utilization, high silica content like about 10% tends to form agglomerates that would block the passageway of proton conduction in the electrically conducting composite material of the anode, and thus hinder the performance of the fuel cell. In addition, in the high current density region, the voltages of the cells drop faster under the case without external humidification with increasing in the current density, especially for electrodes without silica (see FIG. 4b). Without wishing to be bound by any theory, this might be caused by the water imbalance in the cells due to the high water electro-osmotic drag at high current density. In general, the self-humidifying anode with enhancing silica content can improve the performance of the fuel cell under no external humidifying condition.

Stability Test

A fuel cell stability test was conducted using the self-humidifying anode added with silica contents of 6% (in comparison with an anode without adding silica) at the cell temperature of 60° C./50° C. under non-humidifying condition for both $H_2$ and air feedstock (FIG. 5). The fuel cells were operated at a constant current density of 600 mA/cm² and the cell voltage changes were recorded. Before the stability testing, the fuel cells were conducted under humidifying condition at 65° C./60° C./60° C. ($T_{anode\ humidifier}/T_{cell}/T_{cathode\ humidifier}$) for about 1 hr to achieve a stable fuel cell performance (area a in the graph of FIG. 5). Then, the stability testing was carried out under the non-humidifying condition at the cell temperature of 60° C. followed by tested at the cell temperature of 50° C. (area γ in the graph of FIG. 5). The reactant gas flow rates were kept at the stoichiometric values of 1.15 times for $H_2$ and 2 times for air operating fuel cells at 1 A/cm². The fuel cell with the self-humidifying anode demonstrates much higher stable voltage at a constant current density than that of the fuel cell with a normal anode. The fuel cell with the self-humidifying anode also shows a higher voltage at 60° C. than that at 50° C., while the cell with a normal anode displays a higher voltage at 50° C. than that at 60° C. It indicates that the fuel cell with the self-humidifying anode has achieved a significant self-humidifying effect. For the cell with a normal anode, the enhanced voltage at 50° C. is due to the lower water vapor saturation pressure in the cell at 50° C. than that at 60° C., so that the water loss in the membrane at 50° C. would be alleviated. Based on the model developed by Chan et. al. [*Journal of the Electrochemical Society*, 154 (2007): 486-493], we can estimate the optimal temperature for stable operation is about 42° C. at the operating conditions for this stability tests ($p_{H_2}/p_{air}$:0.1/0.1 bar; stoichiometric value for $H_2$ 1.92 and for air 3.33 at the current density of 600 mA/cm²; assuming f value 0.09). An increase in the cell temperature above the optimal temperature lowers the relative humidity at the both anode and cathode chambers and decreases the conductivity of electrolyte membrane, thus the fuel cell performance decreases. In summary, the fuel cell with a self-humidifying anode has much higher stability at the enhanced cell temperature than the fuel cell with a normal anode. It further proves that the anode added with Nafion®/silica can serve the self-humidifying function.

Effect of Thickness of Membrane

Figure 6:
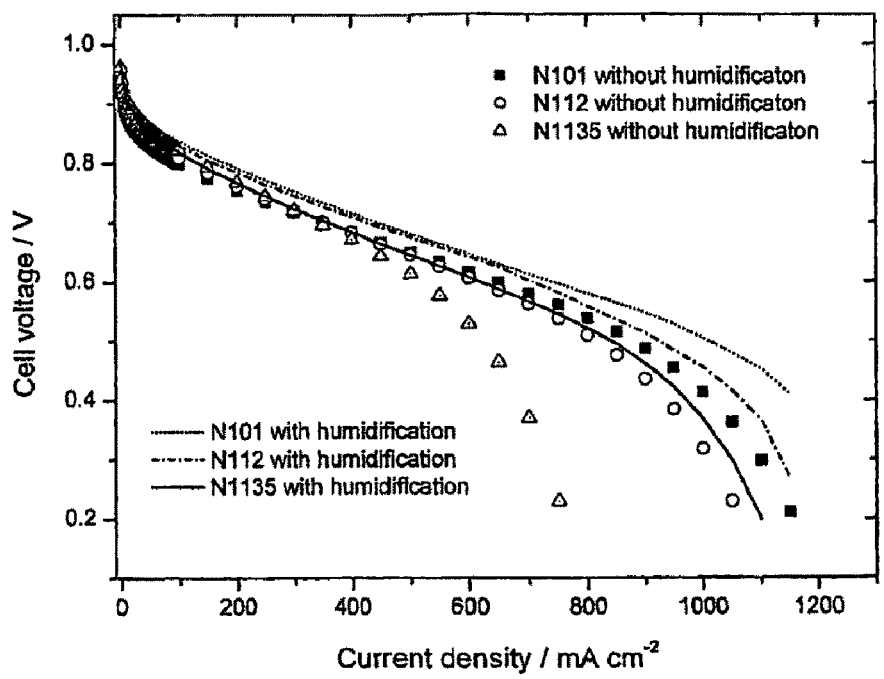
FIG. 6 shows the effect of the thickness of Nafion® membranes (25 μm for N101, 50 μm for N112, and 89 μm for N1135) on the fuel cell performance using the self-humidifying anodes with a silica content of 6%. The x-axis shows the current density/mA*$cm^{-2}$ whereas the y-axis shows the cell voltage/V. It was found that the thickness of the membrane has more impact on the performance of the fuel cells in the case without external humidification (see symbol curve) than that with external humidification at 65/60/60° C. (line curve).

FIG. 6 shows the effect of the thickness of Nafion® membranes (25 μm for N101, 50 μm for N112, and 89 μm for N1135) on the fuel cell performance using the same self-humidifying anodes with the silica content of 6%. It was found that the thickness of the membrane has more impact on the performance of the cells in the case without external humidification (see symbol curve) than that with external humidification at 65/60/60° C. (line curve). The improvement is due to the combined effect of the reduced proton conduction length and the increased conductivity due to considerable back diffusion of water particularly favorable to ultra thin membrane. At the high current density, the increased electro-osmotic drag causes a steep rise of the internal resistance of the cell due to the water imbalance in the membrane under no external humidification condition, thus causing the cell voltage to drop abruptly besides the mass transport limitation. The effect on the cell performance is increasingly serious with increase in the thickness of the membrane.

Figure 7:
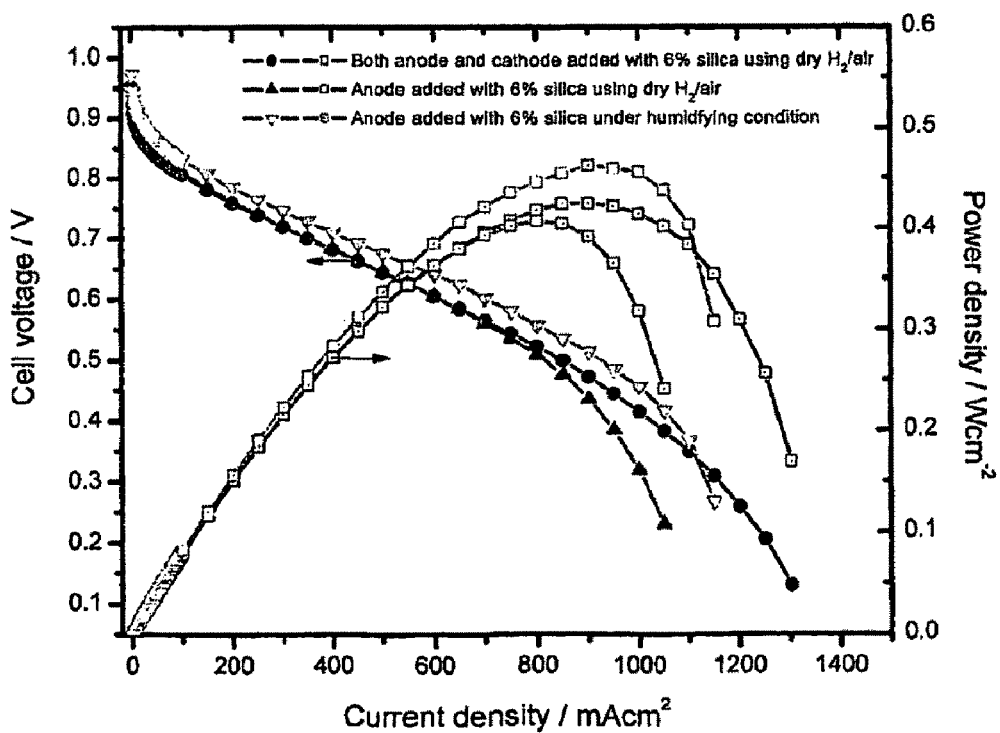
FIG. 7 shows the performance of the fuel cell with the self-humidifying electrode (with 6% silica) for both anode and cathode under dry reactant gas condition in comparison with the fuel cells with self-humidifying anode only under the humidifying condition (65/60/60° C.) and non-humidifying condition at 60° C. The x-axis displays the current density/mA*$cm^2$ whereas the left y-axis displays the cell voltage/V and the right y-axis displays the power density/W*$cm^{-2}$. The arrows within the graph indicate to which axis the different curves should be assigned. It is shown that the addition of particles at the cathode can significantly improve the oxygen transport at the cathode in the fuel cell under dry reactant condition. The fuel cell with the self-humidifying electrode for both anode and cathode under dry reactant condition can provide a larger limiting current than the normal cathode in the fuel cell under the external humidifying condition.

Performance of PEMFCs with Self-Humidifying Electrode on the Both Anode and Cathode Under Dry Reactant Gas Conditions FIG. 7 shows the performance of the fuel cell with the self-humidifying electrode (with 6% silica) for both anode and cathode under dry reactant gas condition in comparison with the fuel cells with self-humidifying anode only under the humidifying condition (65/60/60° C.) and non-humidifying condition at 60° C. It can be seen that the addition of nano-silica particles at the cathode can significantly improve the oxygen transport at the cathode in the fuel cell under dry reactant condition. The fuel cell with the self-humidifying electrode for both anode and cathode under dry reactant condition can provide a larger limiting current than the normal cathode in the fuel cell under the external humidifying condition. It is believed that the nano-silica combined with Nafion® polymer at cathode would have served two functions (1) retaining water produced at the cathode and (2) enhancing the oxygen diffusion in the catalyst layer.

The invention claimed is:

1. An electrically conducting composite material comprising:
    an electrically conducting porous base material;
    a noble metal catalyst loaded onto said porous base material thereby forming an electrically conducting catalytic porous base material;
    hygroscopic particles coated with a proton-conducting polymer wherein said coated hygroscopic particles are incorporated into said electrically conducting catalytic porous base material to form said electrically conducting composite material.

2. The electrically conducting composite material according to claim 1, wherein said noble metal catalyst is selected from the group consisting of platinum, platinum-ruthenium, gold, iridium, osmium, silver, tantalum, rhodium and ruthenium.

3. The electrically conducting composite material according to claim 1, wherein said electrically conducting porous base material is selected from the group consisting of graphite, carbon, and metal foam.

4. The electrically conducting composite material according to claim 1, wherein said electrically conducting catalytic porous base material comprises platinum loaded on carbon particles.

5. The electrically conducting composite material according to claim 1, wherein the average diameter of the pores of said electrically conducting catalytic porous base material is in the range of about 50 nm to about 2 μm.

6. The electrically conducting composite material according to claim 1, wherein said coated hygroscopic particles have an average diameter in the nanometer range (nano-particle).

7. The electrically conducting composite material according to claim 6, wherein said average diameter of said hygroscopic particles is in the range of about 5 nm to about 1 μm.

8. The electrically conducting composite material according to claim 7, wherein said average diameter of said hygroscopic particles is in the range of about 25 to about 35 nm.

9. The electrically conducting composite material according to claim 1, wherein said hygroscopic particles comprises a material selected from the group consisting of sodium formate, sodium ethyl sulfate, magnesium acetate, silicon oxide, titanium oxide, chromium oxide, zinc chloride, calcium chloride, magnesium chloride, lithium chloride, calcium bromide, potassium biphosphate, potassium acetate, phosphorous oxide, ammonium acetate, sodium acetate, sodium silicate, potassium silicate, magnesium sulfate, magnesium oxide, calcium oxide, cerium oxide, silicon oxide zeolite, zirconia, tungsten trioxide, barium oxide, cobalt chloride, bentonite, montmorillonite clay, silica gel, molecular sieve, monohydric compounds, polyhydric compounds, metal nitrate salt, sodium ethyl sulfate organic salt, polyethylene glycol, and combinations thereof.

10. The electrically conducting composite material according to claim 1, wherein said hygroscopic particles comprise a metal oxide or mixtures of metal oxides.

11. The electrically conducting composite material according to claim 10, wherein said hygroscopic particles comprise silica or titanium oxide or $ZrO_2$.

12. The electrically conducting composite material according to claim 1, wherein said proton-conducting polymer is selected from the group consisting of a polymer represented by the formula (I):

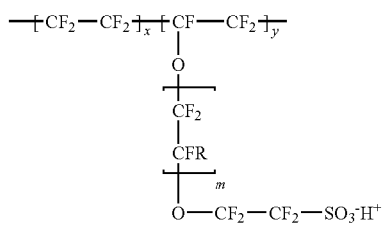

where x and y are integers selected from 1 to 100,000, m is an integer selected from 0 to 10 and R is a functional group selected from the group consisting of H, F, Cl, Br, I, and $CH_3$; a copolymer of said proton-conducting polymer represented by formula (I), a blend of said proton-conducting polymer represented by formula (I) with a second polymer and combinations thereof.

13. The electrically conducting composite material according to claim 1, wherein said proton-conducting polymer is characterized by comprising a structure having a fluorinated backbone which has recurring pendant groups attached thereto and represented by the general formula (II):

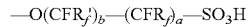

where a=0 to 3, b=0 to 3, a+b=at least 1, $R_f$ and $R_f'$ are independently selected from the group consisting of a halogen and a substantially fluorinated alkyl group having one or more carbon atoms; its copolymer, its blend with a second polymer and combinations thereof.

14. The electrically conducting composite material according to claim 1, wherein said proton-conducting polymer comprises a repeating unit represented by the following formula (III):

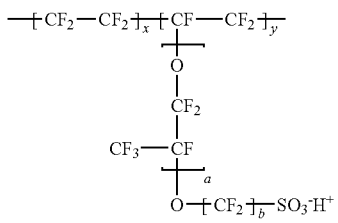

where a is 0, 1, or 2, b is 2 or 3, x and y are positive integer numbers and x/y ratio is of 10 or less; its copolymer, its blend with a second polymer and combinations thereof.

15. The electrically conducting composite material according to claim 1, wherein said proton-conducting polymer is selected from the group consisting of a perfluorosulfonic acid (PFSA) represented by the formula

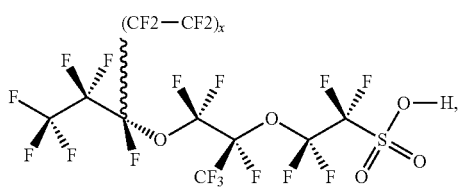

polytetrafluoroethylene (PTFE), sulfonated polysulfone, sulfonated poly(ether sulfone), poly(vinylidene)fluoride (PVDF), Poly(vinylidene)fluoride-chloro tetrafluoro ethylene, (PVDF-chlorotrifluoroethylene (CTFE) copolymer, poly(ethylene glycol), poly(ethylene glycol)/(4-dodecylbenzene sulfonic acid (PEG)/(DBSA), sulfonated styrene-(ethylene-butylene)-sulfonated styrene (SEBSS), poly-(ethyleneoxide)s (PEO), polyvinyl alcohol (PVA), poly-vinylidene fluoride/poly-acrylonitrile (PVDF/PAN), PVDF-g-PSSA (poly(styrene sulfonic acid), sulfonated poly(ether ether ketone) (SPEEK), sulfonated polyethersulfone cardo, sulfonated poly(acrylene ether sulfone), disulfonated poly (arylene ether sulfone), disulfonated poly(arylene ether sulfone), sulfonated polyether ketone (SPEEK)/polybenzimidazole, polybenzimidazole (PBI), poly (vinylalcohol) (PVA), polyethyleneimine (PEI), polystzrene grafted poly(ethylene-alt-tetrafluoroethylene), poly-vinylidene fluoride (PVDF), poly(fluorinated arylene ether)s and mixtures thereof.

16. The electrically conducting composite material according to claim 1, wherein said hygroscopic particles coated with a proton-conducting polymer consist of hygroscopic particles coated with the proton-conducting polymer represented by the formula

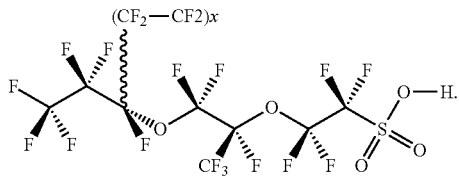

17. The electrically conducting composite material according to claim 1, wherein said hygroscopic particles coated with a proton-conducting polymer consist of silica particles coated with the proton-conducting polymer represented by the formula

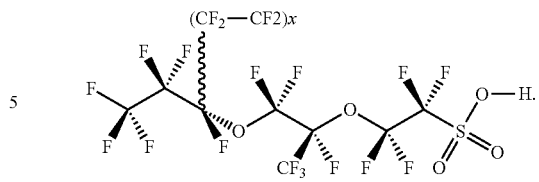

18. The electrically conducting composite material according to claim 1, wherein the content of said hygroscopic particles in said proton-conducting polymer is in a range of about 0.1% to about 6% (w/w).

19. An electrode comprising:
an electrically conducting composite material according to claim 1.

20. The electrode according to claim 19, further comprising a gas diffusion layer.

21. The electrode according to claim 20, wherein said gas diffusion layer and said electrically conducting porous base material of said electrically conducting composite material are made of the same or a different material.

22. A membrane electrode assembly (MEA) comprising an anode, a cathode and a proton-conducting polymer membrane being interposed between said anode and said cathode;
wherein at least said anode comprises an electrically conducting composite material according to claim 1 being in contact on one side with said proton-conducting polymer membrane and a gas diffusion layer being in contact with the other side of said electrically conducting composite material.

23. The membrane electrode assembly (MEA) according to claim 22, wherein said proton-conducting polymer membrane comprises hygroscopic particles.

24. The membrane electrode assembly (MEA) according to claim 22, wherein said gas diffusion layer and said electrically conducting composite material comprise the same or different electrically conducting porous base material.

25. A method of manufacturing an electrode comprising formulating an electrically conducting composite material according to claim 1.

26. A method of manufacturing a fuel cell comprising assembling a membrane electrode assembly (MEA) as defined in claim 22.

27. A method of manufacturing an electrically conducting composite material as recited in claim 1 comprising:
loading said noble metal catalyst onto said electrically conducting porous base material to form said electrically conducting catalytic porous base material;
coating said hygroscopic particles with said proton-conducting polymer; and
incorporating said hygroscopic particles coated with said proton-conducting polymer into said electrically conducting catalytic porous base material.

28. The method according to claim 27, wherein said hygroscopic particles coated with said proton-conducting polymer are manufactured by dispersing said hygroscopic particles in a solution of said proton-conducting polymer; wherein said solution of said proton-conducting polymer is prepared by diluting a stock solution of said proton-conducting polymer with an alcohol.

29. An electrical device comprising a membrane electrode assembly (MEA) as defined in claim 22 as part of an energy source.

30. The electrical device according to claim 29, wherein said electrical device is selected from the group consisting of a cell phone, a computer, a laptop, a photo camera, a video camera and a vehicle.

* * * * *